United States Patent
Levert et al.

(10) Patent No.: US 6,240,967 B1
(45) Date of Patent: Jun. 5, 2001

(54) SLEEVE ASSEMBLY FOR PROTECTING CONDUCTING WIRES AGAINST DAMAGE BY CUTTING IMPLEMENTS

(75) Inventors: Francis Edward Levert; Gerald Clemins Levert, both of Knoxville, TN (US)

(73) Assignee: Kemp Corporation, Knoxville, TN (US)

( * ) Notice: Subject to any disclaimer, the term of this patent is extended or adjusted under 35 U.S.C. 154(b) by 0 days.

(21) Appl. No.: 09/301,924

(22) Filed: Apr. 29, 1999

Related U.S. Application Data

(60) Provisional application No. 60/083,695, filed on Apr. 30, 1998.

(51) Int. Cl.[7] .................................................. F16L 57/00
(52) U.S. Cl. ......................... 138/110; 138/166; 138/167; 138/168; 138/169; 30/210; 174/136
(58) Field of Search ................................. 138/110, 166, 138/167, 168, 169; 30/210; 174/136

(56) References Cited

U.S. PATENT DOCUMENTS

| | | | | |
|---|---|---|---|---|
| 3,517,702 | * | 6/1970 | Mueller et al. | 138/168 |
| 4,422,478 | * | 12/1983 | Pentney et al. | 138/167 |
| 4,647,715 | * | 3/1987 | Butler | 138/168 |
| 4,723,822 | * | 2/1988 | Merdic | 174/136 |
| 4,944,976 | * | 7/1990 | Plummer, III | 138/110 |
| 4,970,351 | * | 11/1990 | Kirlin | 174/136 |
| 5,566,722 | * | 10/1996 | Bartholomew | 138/166 |
| 5,771,941 | * | 6/1998 | Almeida | 138/110 |
| 5,832,960 | * | 11/1998 | Amatsutsu et al. | 138/155 |
| 5,901,756 | * | 5/1999 | Goodrich | 138/167 |
| 5,905,231 | * | 5/1999 | Houte et al. | 138/166 |
| 5,967,194 | * | 10/1999 | Martin | 138/167 |
| 5,993,249 | * | 11/1999 | Benson, Jr. | 174/136 |
| 6,018,874 | * | 2/2000 | Todd | 174/136 |

* cited by examiner

Primary Examiner—James Hook

(57) ABSTRACT

A protective sleeve assembly for preventing damage to a power cord providing alternating voltage and current to an electric cutting implement during the inadvertent contact between the edge of the blade assembly of the cutting implement and the power cord is invented. The protective sleeve assembly comprising: a through-wall slit that extends longitudinally the full length of the protective sleeve assembly where the though-wall slit allows for easy insertion of the power cord into the interior of the sleeve assembly; support surfaces at opposing edges of the through-wall slit which extends the length of the slit that provides for compressive interference between the opposing edges of the slit; and, a method of attaching the first end of the protective sleeve assembly to the alternating current carrying power cord connected to the electric cutting implement.

6 Claims, 7 Drawing Sheets

SLEEVE ASSEMBLY FOR PROTECTING CONDUCTING WIRES AGAINST DAMAGE BY CUTTING IMPLEMENTS

This application claim benefit to provisional application Ser. No. 60/083,695 filed Apr. 30, 1998.

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

1. Field of the Invention

This invention relates to the shielding of the current carrying power cords against the inadvertent damage that occurs to the alternating current (hereafter referred to by the acronym ac) power cord when the blade or blades of a cutting tool make mechanical contact with the power cord connected thereto during the normal operation of the electrically powered tool. Specifically the invention describes a sleeve assembly that protects the power cord from inadvertent damage when a length of an electric cord proximate the cutting tool make physical contact with the cutting edge of the blade assembly of a cutting implement during its use 2. Description of the Related Art Longitudinally extended tubular-shaped covering or electric cord sleeves of thermoplastic synthetic materials with form memory are known and disclosed as in U.S. Pat. No 4,944,976 to Plumer and U.S. Pat. No 5,505,230 to Bartholomew all disclose various designs for tubular enclosures. These tubular enclosures are primarily designed to protect electrical conducting devices over an emended period of time from such undesireable elements such as water and soil. The present invention is designed to prevent accidental damage to power cords connected to electrical trimming or cutting tools. During the use of ac powered trimming and cutting tools, the blades of the tool are sometime inadvertently brought in to contact with the power cord. This accidental contact with the blades by the power cord almost always results in some damage to the power cord causing temporary loss of the use of the ac-powered tool. The diameter of the power cord in many instances is less than the linear distance between adjacent teeth or the blades of a cutting tool. In those cases, the power cord can become wedged between teeth during physical contact therebetween resulting in damage as by shearing or sawing action to the power cord. Typically, a power cord used to supply ac power to an electrical cutting or trimming tool does not have any protective shielding for preventing damage to the cord if it intersects the cutting path of the blade or blades.

It is the primary object of this invention to provide an extended split tubular sleeve that will provide protection for a current carrying power cord when it makes accidental contact with the operating blades of an ac powered tool such as a hedge trimmer.

SUMMARY OF THE INVENTION

The present invention provides a protective sleeve assembly which generally comprises: a tubular sleeve having a longitudinal body which includes a corrugated surface; a split seam that extends from the first end of the tubular sleeve to its second end; and, mating opposing surfaces which extends along the tubular sleeve from the first to the second ends of the longitudinally split seam. The mating surfaces being either compressively contacting or interlocking with defined male and female construction. The protective sleeve assembly is designed to receive, as by insertion at the longitudinal split seam, an electrical power cord and thereby provide protection against blades of a cutting tool when it is used to provide electrical power to cutting implements.

The advantages of the present invention will become apparent from reading the description of the invention in the preferred embodiments given below.

BRIEF DESCRIPTION OF THE PREFERRED EMBODIMENTS

Figure 1:
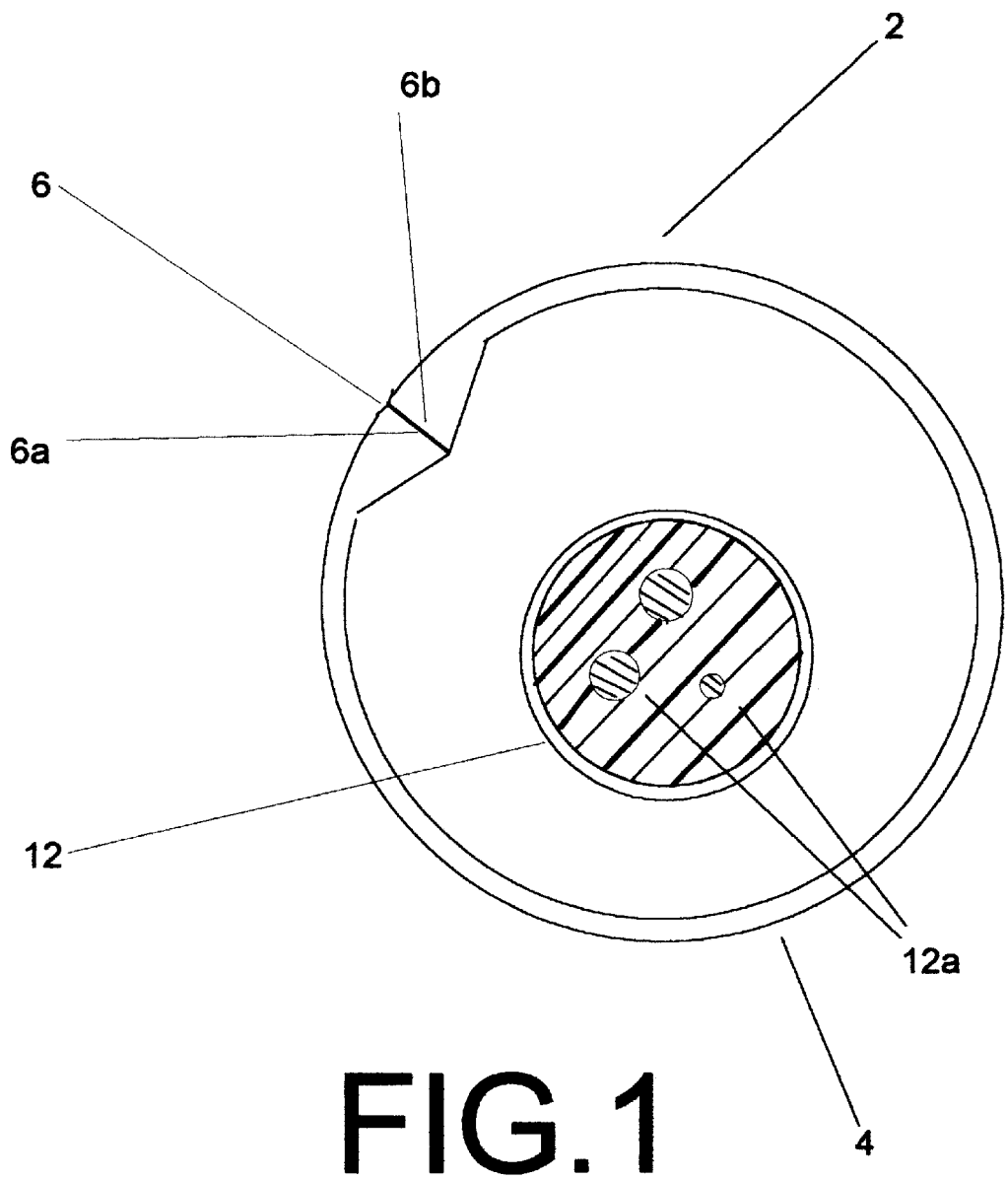
FIG. 1 is a cross-sectional plan view of the preferred embodiment of the sleeve assembly of this invention.

This invention relates to an appliance for preventing accidental damage to electrical conductors conveying electrical power to an electrically powered implement. Referring to FIG. 1, a cross-sectional end view of sleeve assembly 2 of the present invention is shown with split seam 6 having lateral edges 6a and 6b. The body 4 of sleeve assembly 2 is constructed of form memory plastic. The normally contacting edges 6a and 6b are formed by splitting preformed pie shaped protrusion 5 which distends linearly from the first end 8 (see FIG. 2) to the second end 10 of tubular sleeve assembly 2 on its inner surface.

Figure 2:
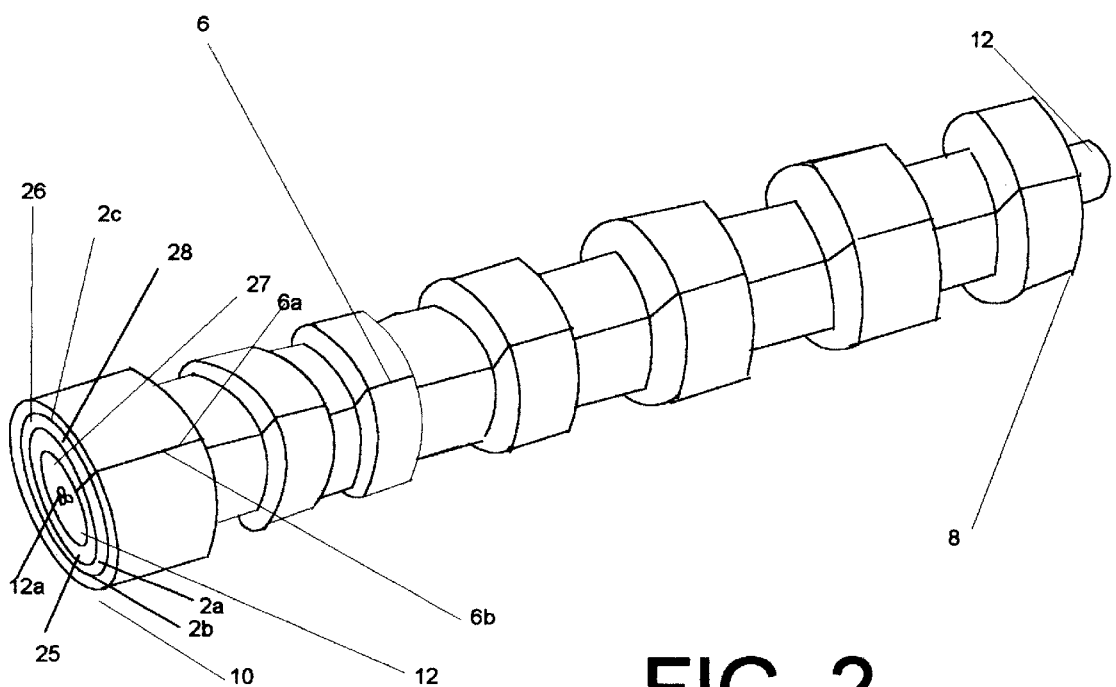
FIG. 2 is a perspective view of the sleeve assembly of this invention.

The edges 6a and 6b are compressively held together due to the circumferential spring characteristics of the form memory plastic body 4 of sleeve assembly 2. The preferred embodiment of FIG. 1 has an overall circular cross-section, although it should be understood that other cross-sectional shapes are possible. Edges 6a and 6b of split seam 6 extend the full length of the sleeve assembly 2 and permits easy insertion of power cord 12 with its multiple conductors 12a into the interior of sleeve assembly 2 as shown in FIG. 1. In this invention, the sleeve assembly 2 is composed of corrugate flexible plastic tubing that can extend longitudinally to any length between its first and second ends 10 and 8, respectively as shown in FIG. 2. The corrugation improves the flexibility of the sleeve assembly 2.

Figure 3:
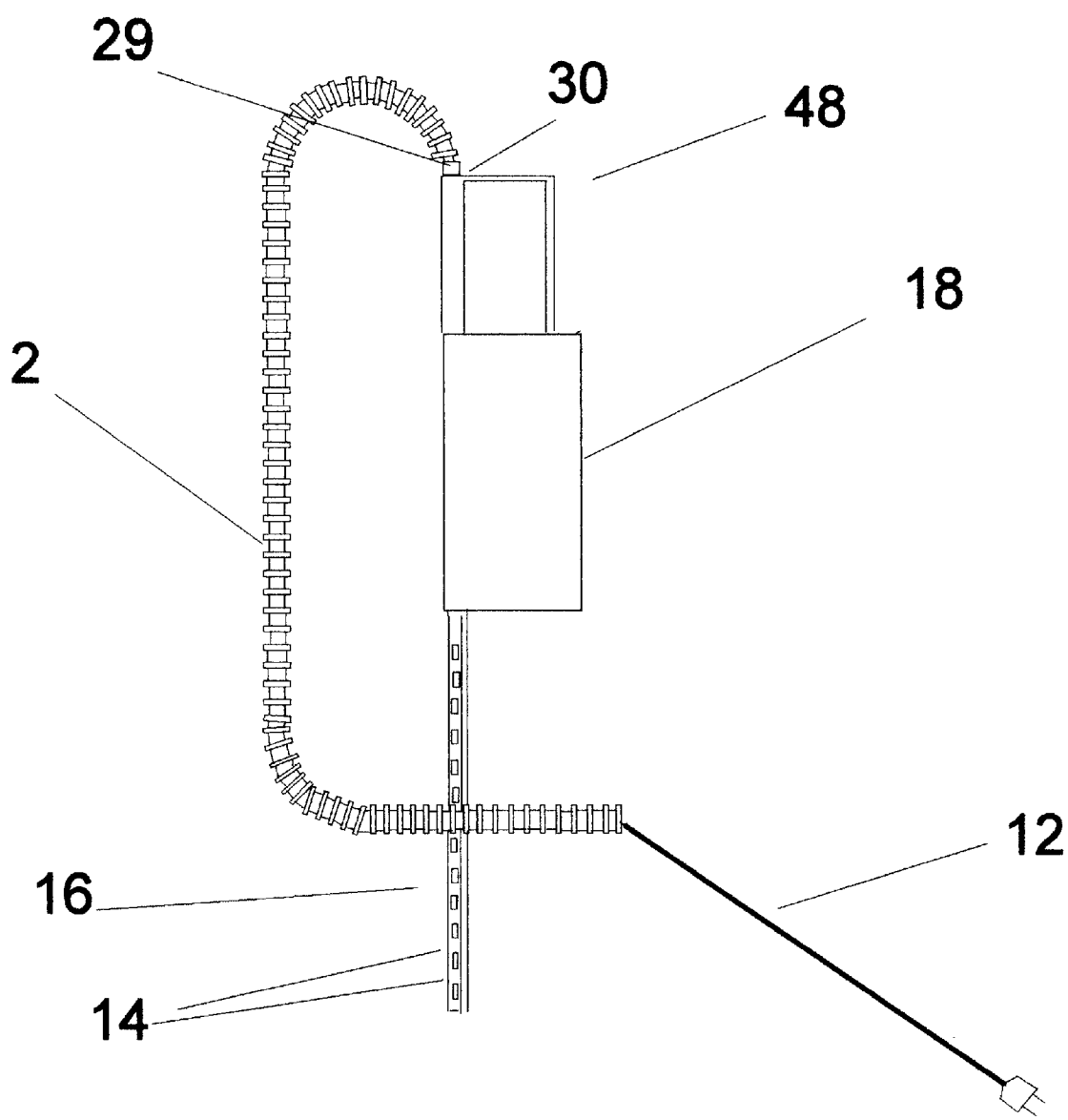
FIG. 3 is a schematic representation of the sleeve assembly employed as shield for power cord in accordance with the present invention.
Figure 4:
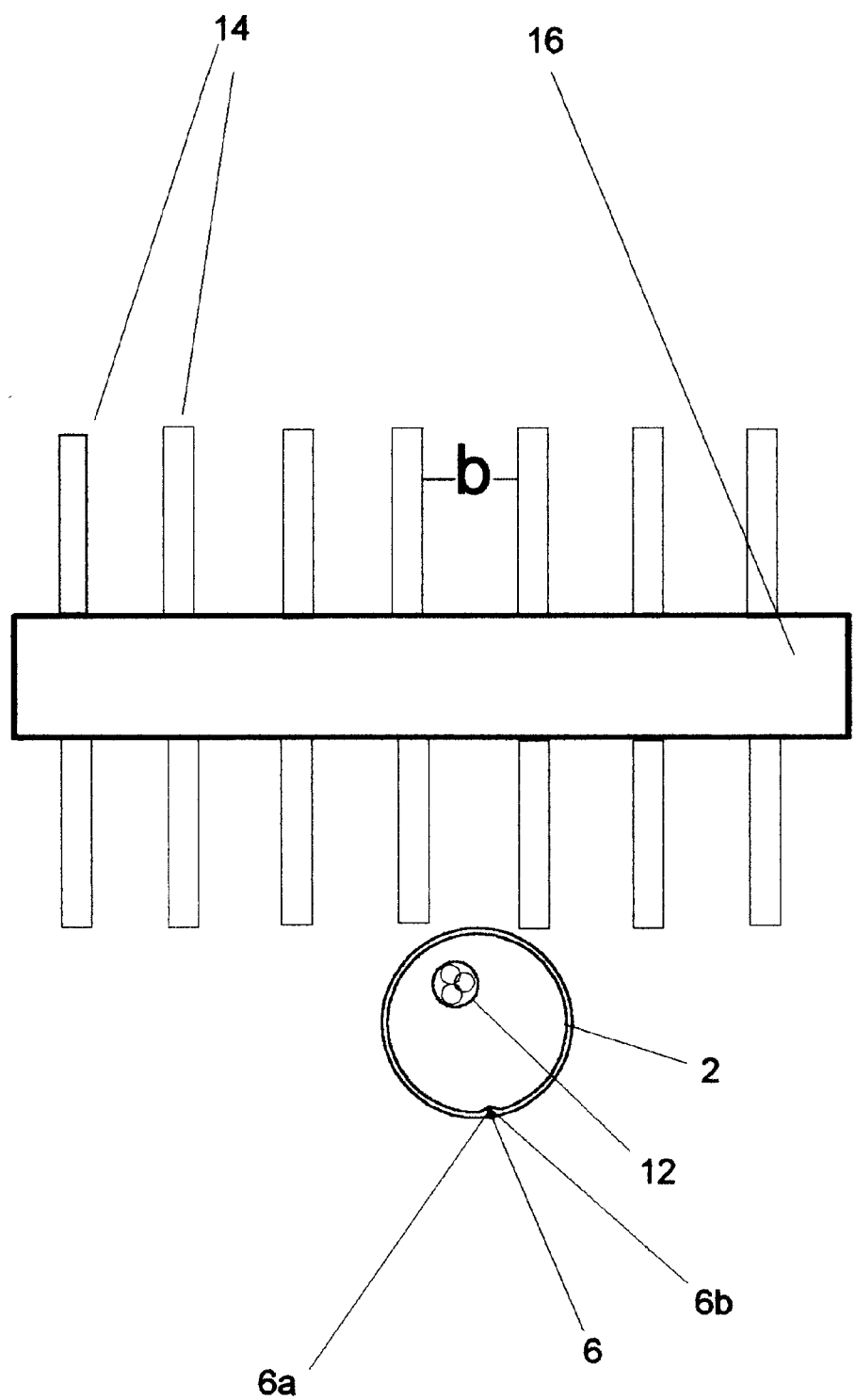
FIG. 4 is a top cross sectional view of the sleeve assembly of the invention in contact with a portion of the blade assembly of a hedge trimmer.

The outer diameter 20 of the sleeve assembly 2 being selectable such that it is greater than the distance between adjacent teeth 14 of a blade assembly 16 of electric hedge trimmer 18 shown in FIG. 3 and FIG. 4. Generally, the distance "b" between adjacent teeth 14 is less than or equal to 16 mm; therefore, the mean diameter of the sleeve assembly must, in general, be greater than 16 mm. That is, the mean diameter of the sleeve assembly must always be greater than distance between adjacent teeth of the blade assembly 16 of an electric powered hedge trimmer 18. The diameter 20 of the sleeve assembly 2, so selected, prevents any portion of the power cord 12 protected by the sleeve assembly 2 from being captured by the reciprocating blades of the blade assembly 16. As seen in FIG. 2, the first end of sleeve assembly 2 contains a cylindrical sleeve of hook fabric 25 of hook-and-loop fastener assembly 26 whose outer surface 2c is adhesively attached to the inner surface 2a of sleeve assembly 2 with adhesive 2b and whose hook fabric 25 is disposed in an inner radial direction and is used to attach sleeve assembly 2 to mating cylindrical shaped loop fabric 28 that is mounted as by adhesive 27 to the outer surface of power cord 12 proximate the first terminal end 29 of power cord 12 (See FIG. 3) which connects electrically to connector 30 of hedge trimmer 18. Hook fabric 25 and cylindrical shaped loop fabric 28, when pressed against each other, provides non slipping contact between the power cord 12 and the sleeve assembly 2. The sleeve assembly 2 has a corrugated surface, it could however, be a smooth non textured surface. Because of its form memory characteristics, the body portion 4 of sleeve assembly 2 has circumferential spring characteristics that cause edges 6a and 6b to return to general compressive touching over substantially the full length of split seam 6 after the insertion of the power cord 12.

Figure 5:
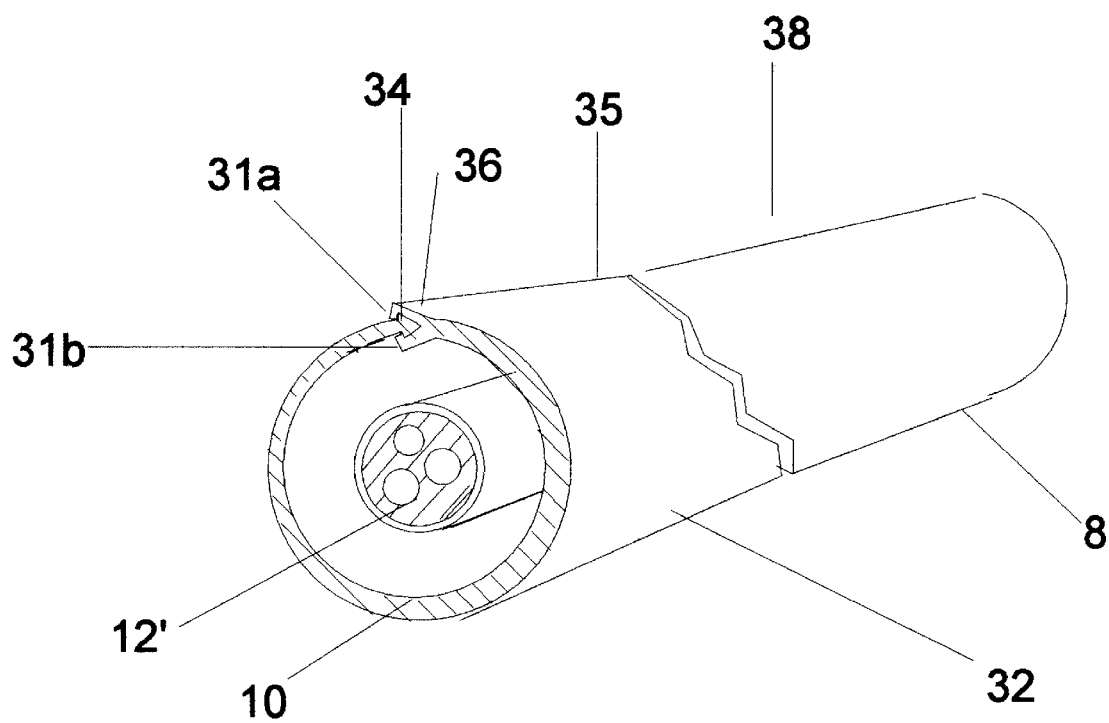
FIG. 5 is a perspective view of the sleeve assembly of the second embodiment of the invention.
Figure 6:
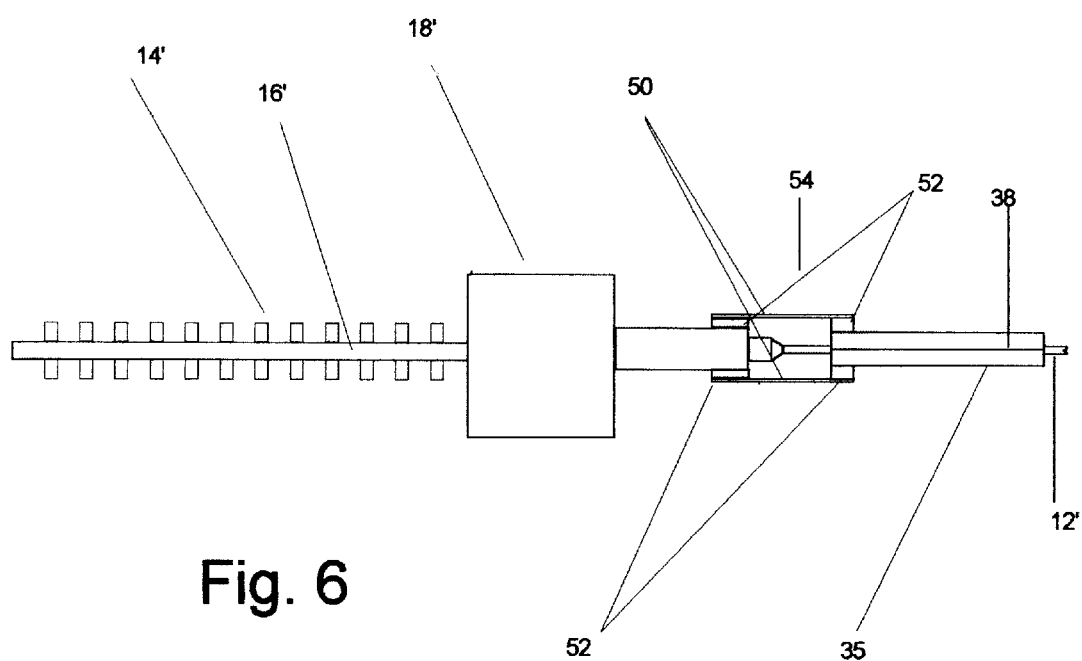
FIG. 6 is a schematic representation of the sleeve assembly, power cord, attached to a cutting implement.

A second embodiment of this invention comprising a tubular body 32 having a opening 35 that extends longitudinally from its first terminal end 33 to its second terminal 33a with male and female locking members 34 and 36, respectively, disposed on opposite sides of the opening 35 is presented. The male and female locking members 34 and 36 are integral parts of the longitudinal opening 35 of tubular body 32 as shown in FIG. 5. The female locking member 36 has substantially an U-shape in cross-section with hooking ends 31a and 31b which prevents the easy retraction of male member 34 after its insertion into U-shape female locking member 36. The female members 36 and male member 34 extends longitudinally the full length of sleeve assembly 38. The male member 34 with its wedge shape is slidably inserted into the female member 36 along the full length of opening 35 of sleeve assembly 38 after the power cord 12' has been inserted therein. The sleeve assembly 38 could be attached to the power cord 12 in the manner of cylindrical hook-and-loop fastener assembly 26 of FIG. 2 or it could be attached to hedge trimmer 18 or power cord 12 near connector 30 by other acceptable mechanical methods. For example, FIG. 6 shows hook fabric 50 and loop fabric 52 acting together to form fastener assembly 54. In the first and second embodiments of this invention, the sleeve assembly is designed to be temporarily attached to the power cord 12 or the electric trimmer 18, it could however be permanently attached to the power cord 12 or made as and integral part of the electrical power carrying unit.

Two embodiments of the apparatus of this invention have been discussed all of which exhibited a single lengthwise slit that allowed for the insertion of a power cord containing multiple insulated conductors into a flexible plastic conduit to prevent the same from been damage by a cutting implement connected to the power cord.

The use of the device of this invention will now be explained. The power cord 12 is inserted into sleeve assembly 2 which allows easy insertion of the power cord 12 over its full length. The length of sleeve assembly 2 is selected such that when placed next to the hedge trimmer 18 in a substantially parallel position the sleeve assembly extends from the handle 48 of hedge trimmer 18 to well past the extreme end of the blade assembly 16. Thus, the length of sleeve assembly 2 serve to prevent contact between the power cord 12 and the reciprocating blades of the blade assembly 16 during normal use of the hedge trimmer 18 as shown in FIG. 5. The sleeve assembly thereby prevents the slippage of power cord 12 between the adjacent teeth 14 when brought in contacted with the blade assembly during the normal operation of the Hedge trimmer 18.

Figure 7:
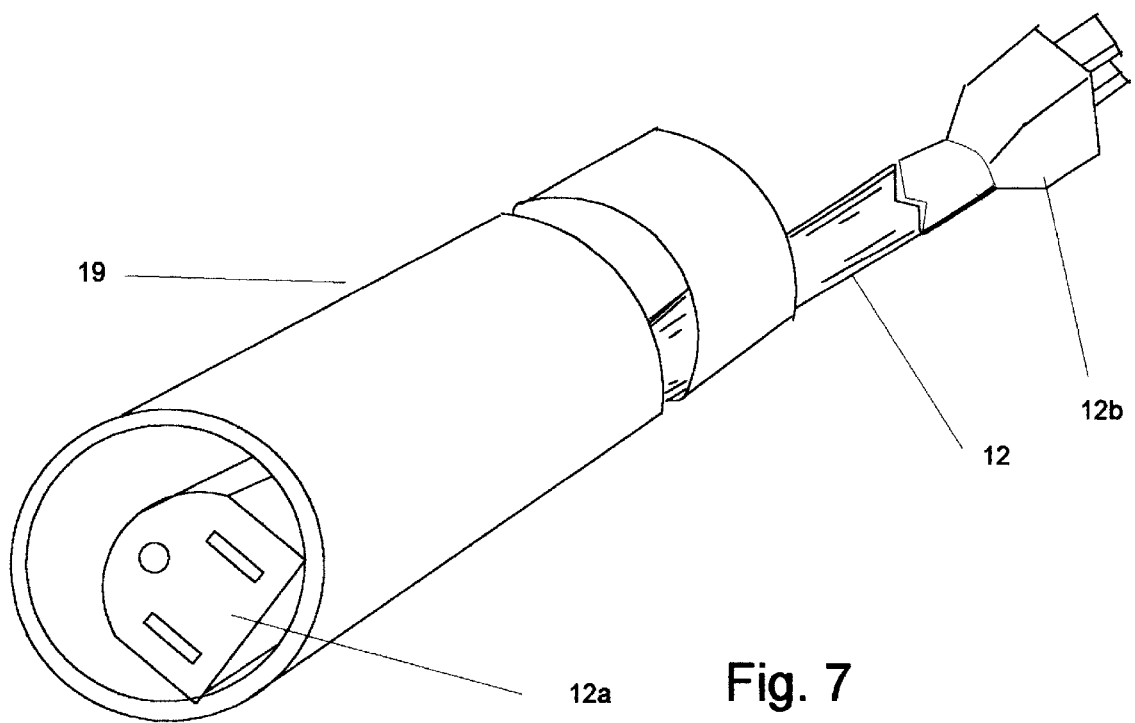
FIG. 7 is an end view of the power cord inserted through a seamless sleeve.

Although the invention has been described relative to specific embodiments thereof, there are numerous variations and modifications that will be readily apparent to those skilled in the art in light of the above teachings. For example, the invention could be carried out using a seamless flexible cylindrical plastic sleeve 19 as shown in FIG. 7 with an inner diameter large enough to accept either female connector 12a or male connector 12b connector of power cord 12 such that the power cord can be slidably inserted into the seamless cylindrical plastic tube at its second end to beyond the first end of the cylindrical plastic sleeve 19. It is therefore to be understood that, within the scope of the appended claims the invention may be practiced other than as specifically described.

What is claimed is:

1. An aegis having an extended cylindrical shape for use with a power cord of an electrically powered cutting implement having cutting protrusions comprises:

a tubular sleeve, having a first end and a second end, with an inner diameter which can easily accept the lengthwise insertion of said power cord and an outer diameter larger than the maximum linear distance between the cutting protrusions of said cutting implement for preventing damage to the power cord;

enabling means for the insertion of a substantial length of the power cord into said tubular sleeve; and means directly connected to the cutting implement and to the first end of the tubular sleeve for affixing the sleeve to the cutting implement.

2. The invention of claim 1 wherein said enabling means for insertion of the power cord into the tubular sleeve comprises a through wall slit that extends from the first end to the second end of the tubular sleeve with opposing contacting edges of said slit having essentially contiguous mechanical pressure therebetween caused by the form memory characteristic of the tubular sleeve.

3. The invention of claim 1 wherein said means directly connected to the cutting implement and to the first end of the tubular sleeve comprises a hook and loop fastener assembly.

4. The invention of claim 1 wherein said enabling means for insertion of the power cable comprises a seamless tubular sleeve that will slidably accept the introduction of a terminal end of the power cable.

5. A protective shield having a cylindrical shape having a first and a second end and an extended length therebetween for preventing damage to a power cord connected to an operating electrical cutting implement comprises:

a selectively closeable tubular sleeve with an inner diameter that is substantially larger diametrically than said power cord having an opening that extends linearly lengthwise from said first end to said second end of said tubular sleeve and an outer diameter that is larger than the maximum distance between cutting protrusions of said cutting implement;

means attached to and extending longitudinally opposite each other on said opening of the selectively closeable tubular sleeve for providing snap close-ability thereof; and loop fabric connected to the cutting implement and which is directly connected to the first end of the selectively closeable tubular sleeve by hook fabric connected thereto.

6. An extended cylindrical shaped apparatus having a first end and a second end for use as a shield for a power cord having a uniform outer diameter for use with an electrically powered cutting implement comprises:

a tubular sleeve, with an inner diameter substantially larger than the uniform outer diameter of said power cord and an outer diameter larger than the maximum linear distance between the cutting elements of said cutting implement for preventing damage to the power cord, having a through wall slit for accepting the insertion of said power cord that extends the full length of the tubular sleeve with opposing contacting edges of said slit having essentially contiguous mechanical pressure therebetween caused by the form memory characteristic of the tubular sleeve; and hooks-and-loops fastener elements attached to the outer surface of the power cord and the inner surface of the first end of the tubular sleeve, respectively, for maintaining the position of the sleeve fixed on the power cord.

* * * * *